Figure 1:
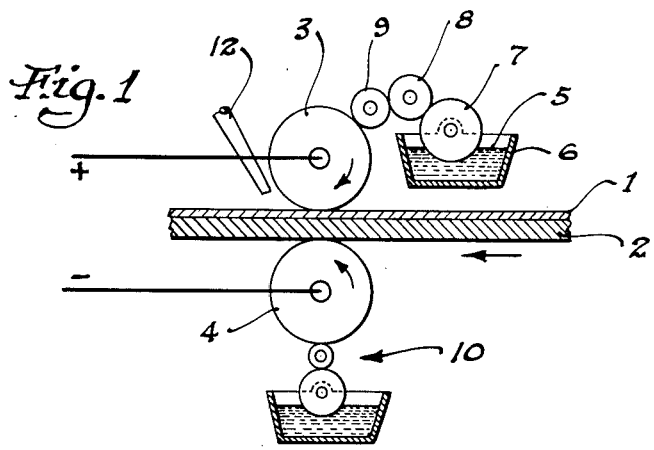

Dec. 2, 1952  G. OTTO  2,620,424
METHOD OF RESISTANCE WELDING TANTALUM
Filed Dec. 29, 1950

Inventor
George Otto
By George F. Mueller
Attorney

Patented Dec. 2, 1952

2,620,424

UNITED STATES PATENT OFFICE 2,620,424

METHOD OF RESISTANCE WELDING TANTALUM

George Otto, Gurnee, Ill., assignor to Fansteel Metallurgical Corporation, North Chicago, Ill., a corporation of New York Application December 29, 1950, Serial No. 203,425

6 Claims. (Cl. 219—10)

This invention relates to a method of producing composite sheets or bodies by resistance welding of at least two metallic elements, at least one of the elements or members consisting of tantalum.

Tantalum may be welded to itself and to other metals and alloys such as nickel, iron, molybdenum, certain steels and the like by resistance welding techniques such as spot welding and roller welding or continuous line or seam welding methods. The welding electrodes employed in these resistance welding methods are formed of copper and copper alloys. Tantalum has a melting point of about 3000° C. and in order to produce a satisfactory weld between two tantalum elements or between a tantalum element and another metal element, such as a nickel sheet, it is necessary to heat the area to be welded to a temperature sufficiently high so as to produce a fusion between the tantalum of the two elements or an alloying of the tantalum and the metal of the other element. Such required temperatures are appreciably above the flowing or melting temperature of the welding electrode materials. Although copper does not alloy with tantalum and with various other metals, such as molybdenum, it will wet the surface of such metals when heated to its flow temperature and will adhere tenaciously to the surface. On the other hand, copper will alloy with many metals and alloys, such as nickel and iron, and may be welded to such metallic materials.

In spot welding, although the electrode may be separated from the tantalum, the welding surface becomes badly pitted and eroded after several welding operations and requires a dressing operation. In continuous line or roller welding methods, the copper wheel likewise becomes seriously pitted and eroded during a single revolution of the welding wheel. In both methods, small particles of copper remain on the surface of the tantalum as the electrode is separated from the tantalum and the copper must be removed subsequently by chemical means. As the electrode wheel rotates, the area contacting the tantalum adheres or "welds" to the tantalum. Further slight rotation of the electrode wheel brings an adjacent area of the electrode wheel into contact with the tantalum. That portion of the surface which has "welded" to the tantalum forms a path for the electrical welding current whose electrical resistance is appreciably lower than the new area of contact. The welding current is, in effect, shunted around the new area or ears of contact until the "welded" area has been broken. As the "welded" area breaks, a normal welding operation is then possible. Thus, there is an actual weld formed only at intermittent areas along the path traversed by the electrode wheel. The electrode wheel thereby becomes badly pitted and eroded because of the small particles which have adhered to the tantalum and which have been torn from the electrode and, in actual operation using a copper welding wheel of about 8" in diameter, the welding surface becomes so badly pitted and eroded in a single revolution of the welding wheel that it is necessary to redress the surface. In those instances where one element is formed of another metal which does not alloy with copper, such as molybdenum, the action is similar.

In those instances where one of the elements of the composite body is formed of a metal or an alloy which alloys with copper, the pitting and erosion of the welding electrode is similar and, in some instances, may be more serious. In these instances there is not only a wetting of the metal or alloy element by the copper of the welding electrode, but there is an alloying or actual welding of the electrode to the other metal.

One of the purposes of this invention is to provide a resistance welding method for the production of composite sheets or bodies consisting of at least two elements, at least one of which is tantalum.

A further object of this invention is to provide a method for eliminating the welding or adherence of copper or copper alloy electrodes to the metallic elements of a composite sheet or body formed by resistance welding of at least two metallic elements, at least one of which is tantalum.

Other objects and advantages of this invention will become apparent from the claims and description which follow.

The present invention contemplates the production of composite sheets or bodies consisting of at least two metallic elements, at least one of which is formed of tantalum by a resistance welding technique wherein the welding electrodes are formed of copper or copper alloys and a thin film of carbon is interposed between the electrode and the metallic element.

I have discovered that composite sheets or bodies of the type described hereinbefore may be formed by resistance welding techniques without encountering adherence of the welding electrodes to the metallic elements of the composite by applying to the surface of the welding electrodes a thin coating or film of carbon. The carbon may be applied to the welding surface of the electrode in any desired manner. For example, it has been found that a thin coating of carbon in the form of soot deposited by the incomplete combustion of a hydrocarbon gas is satisfactory in preventing a "welding" of the electrode to tantalum. The carbon, however, is preferably applied in the form of a suspension in a liquid such as water or hydrocarbon liquids or in petroleum jellies or greases. The hydrocarbon suspensions are preferred because these materials readily wet and adhere to the copper and copper alloy electrode surfaces and the thickness of the film and the amount of carbon may be readily controlled. Heavy or relatively thick layers of finely divided carbon and the hydrocarbon suspensions of carbon should be avoided because of their high electrical resistance.

Such thin coating of carbon is likewise effective in preventing the welding surface of the electrode from adhering to the other metal of the composite body where the other element of the composite is a metal other than tantalum.

I have discovered that the presence of this thin film of carbon between the copper or copper alloy and tantalum or other metal which does not alloy with copper, such as molybdenum, is extremely effective in preventing the wetting of these metals by copper and thereby eliminates "welding" of the copper to such metals. The presence of this thin film of carbon between the copper or copper alloy and the metals which alloy with copper is also extremely effective in preventing such alloying and thereby eliminates the welding of the electrode to such other metals. Thus, there is no adherence of the electrode material to the metal elements of the composite and welding proceeds along the entire path traversed by the electrode wheel without causing a pitting or eroding of the welding surface of the wheel.

Figure 2:
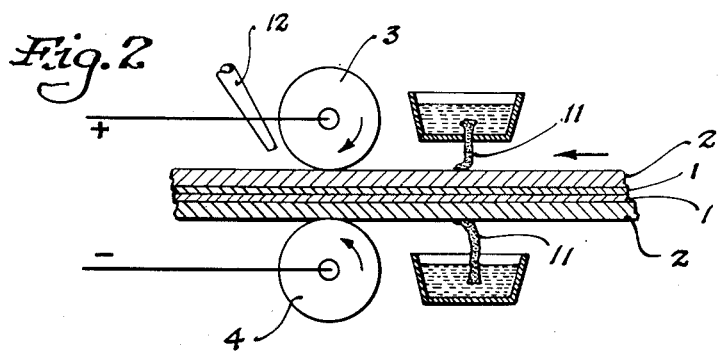

Fig. 1 is a diagrammatic view of one species of the invention, and Fig. 2 is a similar view of another species.

The finely divided carbon or a suspension of the carbon may be applied either to the electrode surface or to the metal element of the composite over the area to be traversed by the electrode. As shown in Fig. 1, the composite body is formed of two sheet elements 1 and 2 which are placed in the desired relationship and passed between the welding electrodes. In Fig. 1, the electrodes 3 and 4 consist of electrode wheels which are connected electrically to a suitable power source. As depicted in Fig. 1, element 1 is of lesser thickness than element 2. It is obvious that both elements may be of the same thickness if desired. Both elements may consist of tantalum or for many practical applications where tantalum is employed because of its chemical characteristics and another metal, such as nickel, is employed for its mechanical and physical characteristics, the tantalum may be of lesser thickness than the other element. The hydrocarbon suspension of carbon 5 is contained in a suitable vat 6 in which a pick-up roller 7 is mounted rotatably. Transfer rollers 8 and 9 are provided to transfer the suspension of carbon from pick-up roll 7 to the welding surface of the electrode wheel 3. The thickness of the film applied to the electrode surface may be regulated by altering the relative positions of transfer rolls 8 and 9. Welding electrode 4 may be provided with similar means 10 for the application of a thin film of a carbon suspension to the surface of electrode 4.

As illustrated in Fig. 2, the composite body may consist of relatively thin sheets 1 formed of tantalum and relatively heavy sheets 2 formed of some other metal or alloy such as nickel. In the production of such body, the copper will alloy with the nickel because of the relatively high temperatures required to form the proper weld between the tantalum and nickel. As shown in Fig. 2, the pick-up and transfer rolls of the apparatus of Fig. 1 are replaced by suitable wicks 11 which apply the carbon suspension to the element of the composite as the elements advance toward the electrode wheel.

It is obvious that the transfer roll type means may be employed to apply the coating to the metal elements of the composite and that the wick type means may be employed to apply the coating to the electrodes. Other methods may be employed to apply the carbon suspension such as spraying, if desired.

Tantalum, at elevated temperatures, has a very high affinity for gases and it is desirable to cool the weld below about 450° C. as rapidly as possible so as to reduce to a minimum the amount of gas absorbed by the heated tantalum. The composite and electrode wheels may be submerged in water or a stream of water or other inert liquid may be supplied immediately adjacent the electrode wheels as by conduit 12. When employing such cooling means the hydrocarbon suspensions of carbon are desirable so as to prevent the carbon from being washed or flushed from the electrode or metallic elements and to maintain the proper carbon film in the desired position.

It is obvious that in a spot welding technique, the electrode or the metallic elements may be coated with the carbon film in like manner. In such technique, the coating material may be applied manually at desired areas of the metallic elements or to the welding surfaces of the electrodes. The assembled elements may be passed between coating rollers or wicks to provide a continuous coating and the electrodes are subsequently brought into contact with the elements as desired coated areas.

I claim:

1. In a resistance welding method of producing a composite metallic body consisting of at least two metallic elements, at least one of which is composed of tantalum, the steps which include interposing a thin film of carbon between the welding electrodes and the metallic elements, said welding electrodes being composed of metal whose melting point is of a substantially lower order than that of tantalum, and passing an electrical welding current through the electrodes, carbon films and metallic elements.

2. In a resistance welding method of producing a composite metallic body consisting of at least two metallic elements, at least one of which is composed of tantalum, the steps which include applying a thin film of carbon to the welding surfaces of the welding electrodes, said welding electrodes being composed of metal whose melting point is of a substantially lower order than that of tantalum, positioning the assembled metallic elements between the electrodes and passing an electrical welding current through the electrodes, carbon films and metallic elements.

3. In a resistance welding method of producing a composite metallic body consisting of at least two metallic elements, at least one of which is composed of tantalum, the steps which include applying a thin film of carbon over the area of the elements to be welded, positioning the welding electrodes in contact with the coated area of the elements, said welding electrodes being composed of metal whose melting point is of a substantially lower order than that of tantalum, and passing an electrical welding current through the electrodes, carbon films and metallic elements.

4. In a resistance welding method of producing a composite metallic body consisting of at least two metallic elements, at least one of which is composed of tantalum, the steps which include interposing a thin film of a hydrocarbon suspension of carbon between the welding electrodes and the metallic elements, said welding electrodes being composed of metal whose melting point is of a substantially lower order than that of tantalum, and passing an electrical welding current through the electrodes, carbon films and metallic elements.

5. In a resistance welding method of producing a composite metallic body consisting of at least two metallic elements, at least one of which is composed of tantalum, the steps which include interposing a thin film of carbon between the welding electrodes and the metallic elements, the welding electrodes being composed of a metallic body selected from the group consisting of copper and copper alloys, and passing an electrical welding current through the electrodes, carbon films and metallic elements.

6. The method of resistance welding tantalum which comprises interposing a thin film of carbon between the welding electrodes and tantalum, the welding electrodes being composed of a metallic body selected from the group consisting of copper and copper alloys, and passing an electrical welding current through the electrodes, carbon films and tantalum.

GEORGE OTTO.

REFERENCES CITED

The following references are of record in the file of this patent:

UNITED STATES PATENTS

| Number | Name | Date |
|---|---|---|
| 1,267,801 | Pfanstiehl | May 28, 1918 |
| 2,005,256 | Eitel et al. | June 18, 1935 |
| 2,145,651 | Funk | Jan. 31, 1939 |